(12) United States Patent
Chen et al.

(10) Patent No.: US 10,683,794 B2
(45) Date of Patent: Jun. 16, 2020

(54) CHILLER SYSTEM FOR AN ENGINE WITH A FORCED INDUCTION SYSTEM

(71) Applicant: FCA US LLC, Auburn Hills, MI (US)

(72) Inventors: Huaguo Chen, Troy, MI (US); Cody R Wagner, Royal Oak, MI (US); Terry L England, Clinton Township, MI (US); Jeremy J Anker, Lake Orion, MI (US); Gregory Kiester, Metamora, MI (US); Matthew T Bartlett, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/994,228

(22) Filed: May 31, 2018

(65) Prior Publication Data
US 2018/0274433 A1    Sep. 27, 2018

Related U.S. Application Data

(63) Continuation of application No. 15/006,526, filed on Jan. 26, 2016, now Pat. No. 10,006,339.

(51) Int. Cl.
  *F02B 29/04* (2006.01)
  *F02M 26/32* (2016.01)
  *F01P 9/06* (2006.01)

(52) U.S. Cl.
  CPC .......... *F02B 29/0443* (2013.01); *F01P 9/06* (2013.01); *F02B 29/0493* (2013.01);
  (Continued)

(58) Field of Classification Search
  CPC ...... F01P 9/06; F01P 2060/02; F02B 29/0443; F02B 29/0493; F02M 26/32; Y02T 10/146
  See application file for complete search history.

(56) References Cited

U.S. PATENT DOCUMENTS 5,954,617 A * 9/1999 Horgan ............... B60K 31/047
                                                123/349
6,347,618 B1   2/2002 Klem
(Continued)

OTHER PUBLICATIONS

KPI home of the Killer Chiller, Stops Power Fade and Timing Retard Due to IC Heat Soak, KillerChiller.com Website, http://killerchiller/, retrieved Jan. 5, 2017, 57 pages.

*Primary Examiner* — Brandon D Lee
(74) *Attorney, Agent, or Firm* — Ralph E. Smith

(57) ABSTRACT

A chiller system includes an intercooler configured to cool compressed charge air received from a charger, a low temperature cooling circuit fluidly coupled to the intercooler, and an air conditioner circuit circulating a refrigerant and having a primary circuit and a bypass circuit. The primary circuit includes a compressor, a condenser, and an evaporator. The bypass circuit includes a conduit that bypasses the evaporator, and a chiller shut off valve is configured to selectively prevent refrigerant from flowing through the bypass circuit. A chiller is thermally coupled to the low temperature cooling circuit and the bypass circuit. A controller is in signal communication with the chiller shut off valve. The controller is programmed to, upon receiving a signal indicating a driver has manually selected the vehicle to operate in a racing mode, open the chiller shut off valve to provide increased cooling to the intercooler and the compressed charge air.

16 Claims, 2 Drawing Sheets

(52) U.S. Cl.
CPC ......... *F02M 26/32* (2016.02); *F01P 2060/02* (2013.01); *Y02T 10/146* (2013.01)

(56) References Cited

U.S. PATENT DOCUMENTS

| | | |
|---|---|---|
| 6,796,134 B1 | 9/2004 | Bucknell et al. |
| 7,779,821 B2 | 8/2010 | Noyama et al. |
| 2003/0015183 A1* | 1/2003 | Sealy ................. F02B 27/02 123/563 |
| 2007/0000247 A1 | 1/2007 | Perkins |
| 2009/0031999 A1 | 2/2009 | Erickson |
| 2009/0145409 A1* | 6/2009 | Noyama ............ F02B 29/0412 123/542 |
| 2014/0202178 A1* | 7/2014 | Trumbower ....... B60H 1/00278 62/62 |
| 2014/0374498 A1* | 12/2014 | Quix ..................... B60H 1/04 237/12.3 R |

* cited by examiner

CHILLER SYSTEM FOR AN ENGINE WITH A FORCED INDUCTION SYSTEM

CROSS REFERENCE TO RELATED APPLICATIONS

This application is a continuation of U.S. patent application Ser. No. 15/006,526, filed Jan. 26, 2016, the contents of which are incorporated herein by reference.

FIELD

The present application relates generally to charge air cooling systems for an engine having a forced induction system and, more particularly, to a system and method for secondary charge air cooling of such an engine.

BACKGROUND

Some conventional vehicles include a turbocharger and/or a supercharger, which increase the air or air/fuel mixture density of an engine by increasing the pressure of the intake air stream prior to its entering a cylinder of the engine. Increasing the density of air in the cylinder may be desirable because it provides a method of increasing the power generated by the engine. Since pressure is directly related to heat, as the charger increases the pressure of the intake air stream, it also increases the temperature. Cooling of this charged intake air stream enables an additional increase in its pressure since cooler air can be more densely packed. This additional cooling is typically accomplished through the use of an intercooler.

Some intercoolers may include a secondary cooling feature provided by an additional component such as, for example, a vehicle air conditioning circuit. However, such systems typically continuously draw cooling from the additional component, thereby overworking the system and reducing its performance. Moreover, the additional component will need to be increased in size to support the secondary cooling in addition to its primary operation. Accordingly, while such conventional intercooler cooling systems work for their intended purpose, it is desirable to provide an improved intercooler cooling system with improved control features.

SUMMARY

According to one example aspect of the invention, a chiller system for a vehicle having an engine with a forced induction arrangement is provided. In one exemplary implementation, the chiller system includes an intercooler configured to cool compressed charge air received from a turbocharger or a supercharger, a low temperature cooling circuit fluidly coupled to the intercooler, the low temperature cooling circuit circulating a coolant to provide cooling to the intercooler and including a low temperature radiator configured to cool the coolant, and an air conditioner circuit circulating a refrigerant and having a primary circuit and a bypass circuit. The primary circuit is separate from the low temperature cooling circuit and includes a compressor, a condenser, and an evaporator. The bypass circuit includes a conduit that bypasses the evaporator, and a chiller shut off valve is configured to selectively prevent refrigerant from flowing through the bypass circuit. A chiller is thermally coupled to the low temperature cooling circuit and the bypass circuit. A controller is in signal communication with the chiller shut off valve. The controller is programmed to, upon receiving a signal indicating a driver has manually selected the vehicle to operate in a racing mode, open the chiller shut off valve to provide refrigerant to the chiller to further cool the coolant in the low temperature cooling circuit after the coolant is cooled by the low temperature radiator, thereby providing increased cooling to the intercooler and the compressed charge air to increase engine performance.

In addition to the foregoing, the described chiller system may include one or more of the following features: wherein racing mode is selected by selecting an icon on a vehicle user interface display; wherein when the racing mode is selected, the controller is programmed to disable vehicle air conditioning system controls and air conditioning of a vehicle cabin interior; and wherein the air conditioning circuit further includes an evaporator shut off valve in communication with the controller and disposed upstream of the evaporator, the evaporator shut off valve configured to selectively prevent refrigerant from flowing to the evaporator, and wherein upon the controller receiving the signal indicative of the vehicle being commanded to operate in the racing mode, the controller controls the evaporator shut off valve to close and the chiller bypass valve of the bypass circuit to open thereby providing flow of refrigerant from the primary circuit to the chiller.

In addition to the foregoing, the described chiller system may include one or more of the following features: wherein the air conditioning circuit further includes a first expansion valve disposed upstream of the evaporator, and a second expansion valve disposed in the bypass circuit upstream of the chiller; wherein the controller is programmed to maintain the vehicle air conditioning system controls and air conditioning of the vehicle cabin interior in the disabled condition while the racing mode is selected; and wherein when the racing mode is selected, the controller is programmed to display a notification on a vehicle user interface display that the racing mode is active and cabin cooling is disabled.

In addition to the foregoing, the described chiller system may include one or more of the following features: wherein the low temperature radiator is disposed in the low temperature cooling circuit downstream of the intercooler and upstream of the chiller; wherein the controller is configured to, in an absence of receiving the signal indicative of the vehicle being commanded to operate in the racing mode, operate the vehicle in a default or normal driving mode where the chiller shut off valve is closed to prevent refrigerant from flowing through the bypass circuit to the chiller, cool the intercooler with only the coolant in the low temperature cooling circuit that has been cooled by the low temperature radiator; and enable the vehicle air conditioning system controls and air conditioning of the vehicle cabin interior.

In addition to the foregoing, the described chiller system may include one or more of the following features: a high temperature cooling circuit separate from the low temperature cooling circuit and the air conditioning circuit, the high temperature cooling circuit fluidly coupled to the engine and including a high temperature radiator and a thermostat, the high temperature cooling circuit configured to provide cooling to the engine independent of the low temperature radiator circuit and the intercooler; wherein the controller is further programmed to maintain the chiller shut off valve in the open position while the vehicle is commanded to operate in the racing mode; and wherein the controller is further programmed to close the shutoff valve if the driver manually commands the vehicle to operate in a default mode.

According to another example aspect of the invention, a method of controlling a vehicle having an engine and a controller in communication with an engine chiller system is provided. In one exemplary implementation, the engine chiller system includes (a) a low temperature cooling circuit thermally coupled to an intercooler that receives compressed charge air from a charger, the low temperature cooling circuit circulating a coolant and including a radiator configured to cool the coolant, (b) an air conditioner circuit circulating a refrigerant and having a primary circuit and a bypass circuit that bypasses an evaporator of the primary circuit, and includes a chiller shut off valve, and (c) a chiller thermally coupled to the low temperature cooling circuit and the bypass circuit. The method includes receiving a signal indicative of the vehicle being manually selected by a driver of the vehicle to operate in a racing mode, opening the chiller shut off valve based on receiving the signal such that refrigerant flows to the bypass circuit and the chiller, and cooling the intercooler with the coolant in the low temperature cooling circuit that has been cooled by (i) air flowing through the low temperature radiator and (ii) the refrigerant flowing through the chiller, thereby providing increased cooling to the intercooler and compressed charge air for increased engine performance when the vehicle is in the racing mode.

In addition to the foregoing, the described method may include one or more of the following features: disabling vehicle air conditioning system controls and air conditioning of a vehicle cabin interior when the signal is received; wherein the chiller system further comprises an evaporator shutoff valve in the primary circuit upstream of the evaporator, the method further comprising, upon receipt of the signal, commanding the evaporator shutoff valve to close thereby providing flow of refrigerant to the bypass circuit and the chiller for increased cooling of the coolant in the low temperature radiator circuit; and in an absence of receiving the signal, operating the vehicle in a default or normal driving mode where the chiller shut off valve is closed to prevent refrigerant from flowing through the evaporator bypass circuit to the chiller, and cooling the intercooler with only the coolant in the low temperature cooling circuit that has been cooled by the radiator.

In addition to the foregoing, the described method may include one or more of the following features: wherein the signal is received based on user selection of the racing mode via a user interface display in an interior of the vehicle; and maintaining the vehicle air conditioning system controls and air conditioning of the vehicle cabin interior n the disabled condition while the vehicle operates in the racing mode, and enabling the vehicle air conditioning system controls and air conditioning of the vehicle cabin interior when the racing mode is deactivated.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
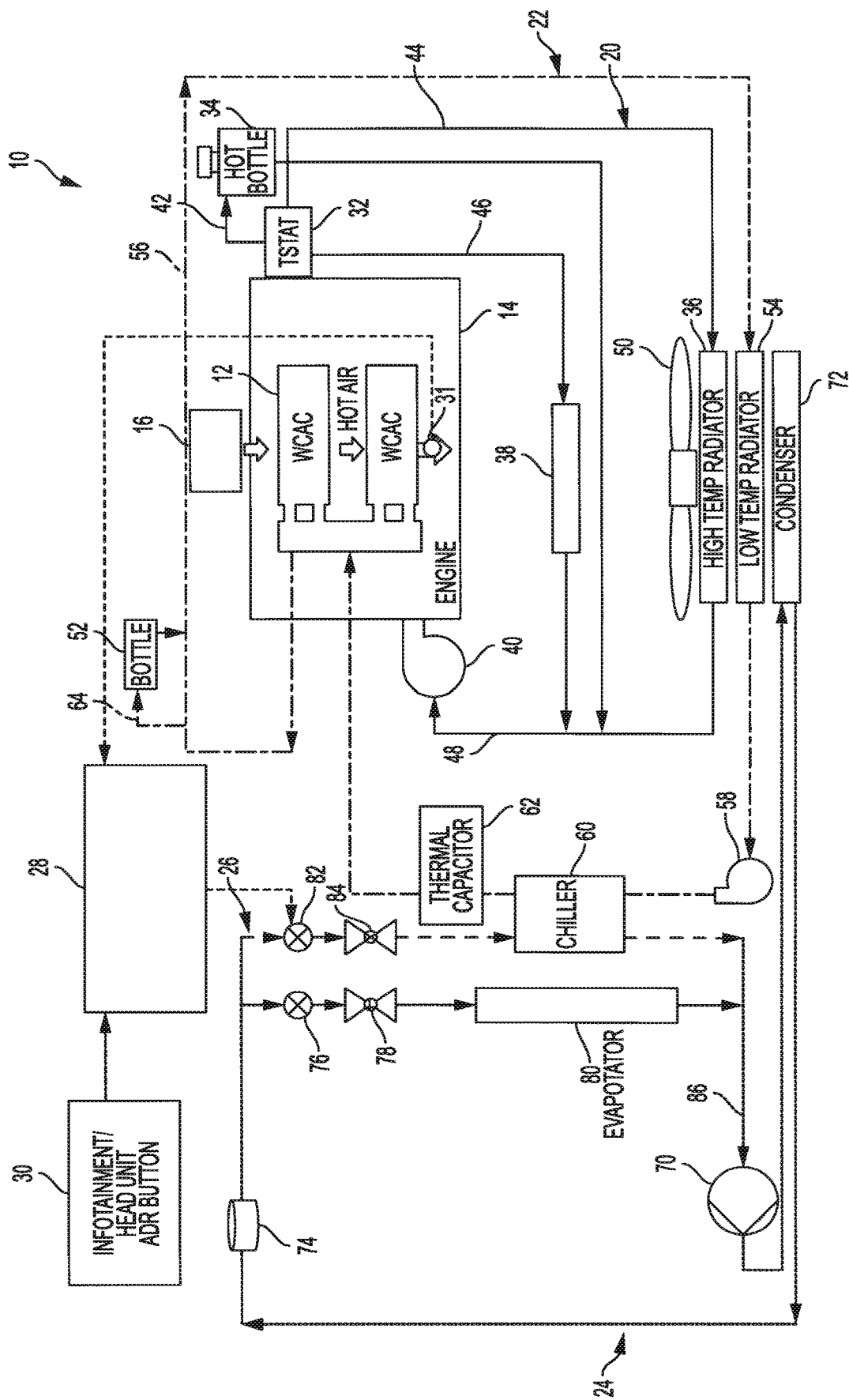
FIG. 1 is a schematic view of an example engine chiller system in accordance with the principles of the present disclosure.
Figure 2:
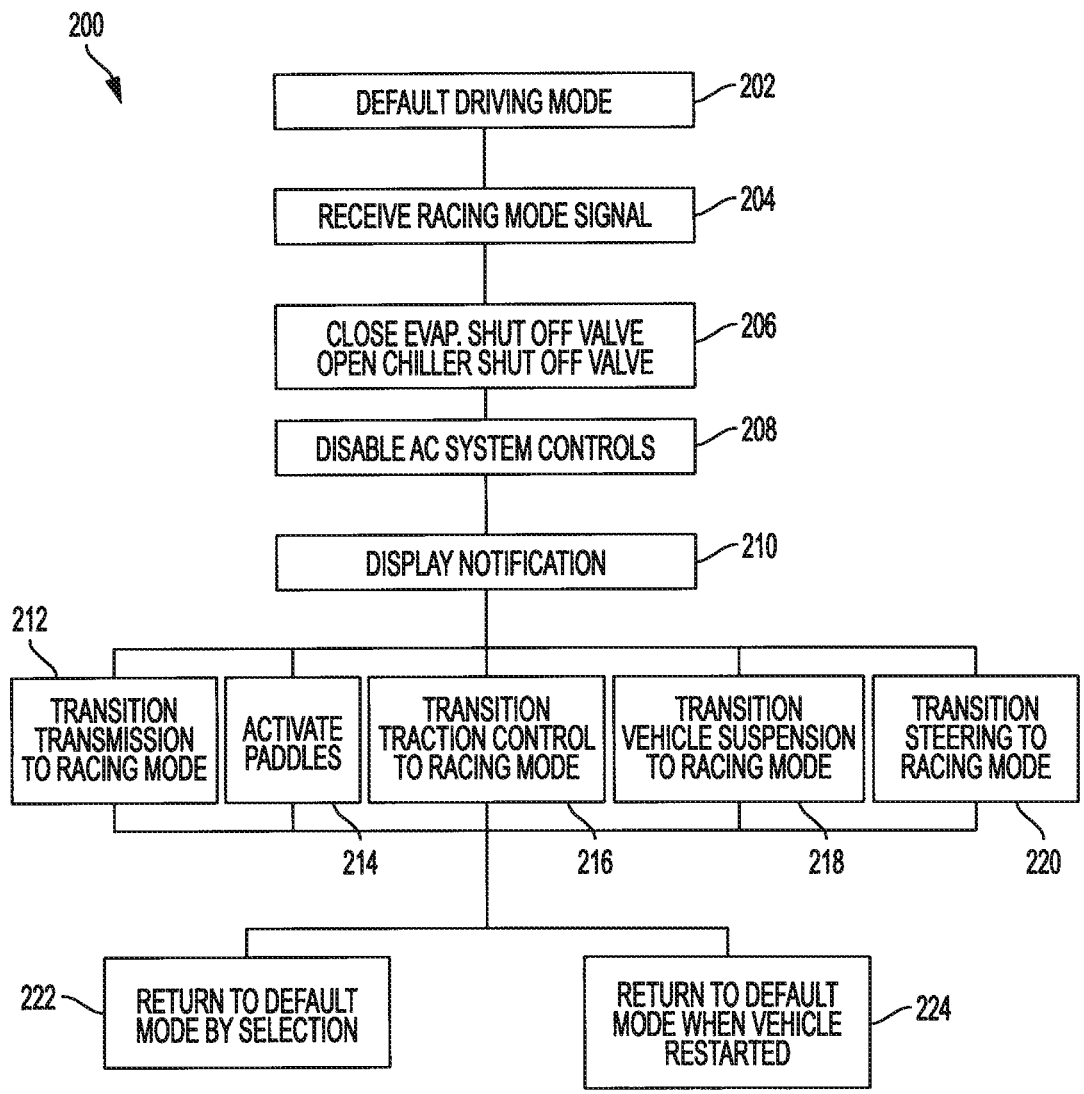
FIG. 2 is a schematic flow diagram of an example operation of the engine chiller system shown in FIG. 1.

With initial reference to FIG. 1, an example vehicle engine chiller system for a vehicle engine is illustrated and generally identified at reference numeral 10. The engine chiller system 10 is configured to provide cooling to an intercooler 12 of a vehicle engine 14 that includes a turbocharger or supercharger 16. The intercooler 12 receives hot compressed air from the charger 16, absorbs heat therefrom, and subsequently supplies cooled, compressed air to an intake and cylinders (not shown) of the engine 14.

In one exemplary implementation, the engine chiller system 10 generally includes a high temperature circuit 20, a low temperature circuit 22, and an air conditioning circuit 24 having an evaporator bypass loop 26. In one exemplary implementation, and as will be discussed herein, the circuits 20, 22, 24 are discrete circuits fluidly separate from each other.

The engine chiller system 10 is in signal communication with a controller 28 such as an engine control module (ECM), which is in signal communication with a vehicle user interface 30 and an air charge temperature sensor 31. As described herein in more detail, a user, such as a driver, may selectively initiate a "drag racing" or "track racing" driving mode for the vehicle, which activates the evaporator bypass loop 26. This provides increased cooling to intercooler 12, which results in increased engine power and performance.

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In one exemplary implementation, the high temperature circuit 20 circulates a first heat transfer fluid or coolant (e.g., water) and generally includes a thermostat 32, an overflow bottle 34, a high temperature radiator 36, a cabin heat exchanger 38, and a pump 40. The first coolant is heated by engine 14 and is subsequently supplied through thermostat 32 to a first branch conduit 42, a second branch conduit 44, and a third branch conduit 46.

The first branch conduit 42 directs heated coolant to the overflow bottle 34, which is configured to remove air trapped in the circuit 20. The coolant is then directed to a coolant supply line 48. The second branch conduit 44 directs heated coolant to the high temperature radiator 36, where the heated coolant is cooled by ambient air and/or an airflow created by a fan 50, The cooled coolant is then supplied to the coolant supply line 48. The third branch conduit 46 directs the heated coolant to the cabin heat exchanger 38 where thermal energy of the heated coolant is used to provide heating to the vehicle passenger cabin (not shown). The cooled coolant is then directed to the coolant supply line 48.

The pump 40 is disposed within circuit 20 and is configured to circulate the first coolant around the high temperature circuit 20. In the example embodiment, the first coolant may be selectively supplied to branch conduits 42, 44, 46 such that each of the branch conduits may be used alone or in any combination. As such, pump 40 supplies the cooled coolant within supply line 48 to the engine 14 to provide cooling thereto.

In one exemplary implementation, the low temperature circuit 22 is fluidly separate from high temperature circuit 20 and circulates a second heat transfer fluid or coolant such as water. In the illustrated example, the low temperature circuit 22 is dedicated to providing cooling to only the intercooler 12. Low temperature circuit 22 generally includes an overflow bottle 52, a low temperature radiator 54, a pump 58, and a heat exchanger or chiller 60. In some implementations, circuit 22 may also include a thermal capacitor 62. The second coolant is heated within intercooler 12 against the hot compressed air from charger 16, and is directed to low temperature radiator 54 via a conduit 56. Along the way, at least a portion of the heated coolant may be directed along a loop 64 to the overflow bottle 52, which is configured to remove air trapped in circuit 22.

The heated second coolant is cooled within the low temperature radiator 54 by ambient air and/or ram airflow from fan 50. As used herein, ram airflow is the amount of ambient air forcing through a vehicle grille and heat exchanger from dynamic air pressure created when the vehicle is in motion. The cooled coolant is subsequently supplied to chiller 60 via pump 58, which is disposed within circuit 22 and is configured to circulate the second coolant around the low temperature circuit 22. The cooled coolant may receive further cooling within the chiller 60, as described herein in more detail, and is subsequently returned to intercooler 12 for cooling of the charge air. When utilized in circuit 22, thermal capacitor 62 is used as a low temperature reservoir configured to store pre-cooled coolant to provide increased cooling to intercooler 12, act as a buffer for transient thermal inertia, and avoid AC compressor shock. In the illustrated example, the low temperature radiator 54 and the high temperature radiator 36 are discrete components.

In one exemplary implementation, air conditioning circuit 24 is a standard vehicle air conditioning system that generally includes a compressor 70, a condenser 72, a receiver/dryer 74, an evaporator shut off valve 76, a first expansion device 78, and an evaporator 80. However, circuit 24 additionally comprises the evaporator bypass loop or circuit 26, which includes a chiller shut off valve 82 and a second expansion device 84. As described herein in more detail, the vehicle and thus system 10 may be selectively switched between a default (normal) driving mode and the track racing driving mode. As will also be described herein in more detail, the chiller 60 of the low temperature circuit 22 is thermally coupled to the bypass circuit 26, but fluidly separate therefrom.

In the default driving mode, a suction line 86 provides gaseous refrigerant to compressor 70, which subsequently compresses the refrigerant. The compressed and heated refrigerant is directed to the condenser 72 where the heat from compression is dissipated and the refrigerant condenses to a liquid. During normal operation, shut off valve 76 is open and chiller shut off valve 82 is closed. As such, the liquid refrigerant is directed through expansion device 78 (e.g., an expansion valve) where it is reduced in pressure and vaporized, thereby reducing the temperature of the refrigerant. The cooled vapor refrigerant is then supplied to evaporator 80 where it is evaporated to providing cooling to the cabin air. The resulting gaseous, warmed refrigerant is then returned to the compressor 70 via suction line 86 where the cycle is repeated.

In track racing driving mode, evaporator shut off valve 76 is closed and chiller shut off valve 82 is open. As such, the liquid refrigerant is directed through expansion device 84 (e.g., expansion valve) where it is reduced in pressure and vaporized, thereby reducing the temperature of the refrigerant. The cooled refrigerant is then supplied to chiller 60, which functions as an evaporator and further cools the second coolant in low temperature circuit 22, thereby providing increased (secondary) cooling to intercooler 12. Accordingly, in the track racing mode, the refrigerant is not supplied to evaporator 80, which reduces or eliminates cooling of the cabin air. However, in some alternative examples, both of valves 76 and 82 may remain open during operation.

In the example implementation, engine chiller system 10 uses ram air cooled low temperature circuit 22 as the primary cooling source for intercooler 12, and only selectively uses evaporator bypass loop 26 and chiller 60 as a secondary cooling source for intercooler 12. The chiller 60 is disposed downstream of low temperature radiator 54 and will only add refrigerant cooling to circuit 22 when air charge temperature cooling is required and/or the driver has selected a drive mode that supports active chiller operation (i.e., track racing mode). As such, chiller 60 may be selectively used as a secondary cooling source for intercooler 12, which avoids AC compressor overload and the need for a larger heat exchanger by disabling interior cabin cooling and only using the secondary refrigerant cooling when in the track racing mode.

In this way, engine chiller system 10 is thus more practical for implementation than known systems because a vast majority of daily driving of the vehicle will only require the use of the ram air cooling low temperature circuit 22, and the evaporator bypass loop 26 will be closed. This provides increased cabin comfort and acceptable street engine power performance while not requiring increasing the capacity of the NC compressor 70.

However, when the driver prioritizes engine performance over cabin AC performance (i.e., during track racing), the driver can select the track racing mode via the vehicle user interface 30. This selection transitions the vehicle from the default driving mode to the track racing mode. Accordingly, engine chiller system 10 enables the driver to selectively choose between optimum driver cooling comfort and increased engine performance, while maintaining current AC component sizing and without negatively affecting vehicle weight or fuel economy that would be required to optimize both simultaneously. Thus, system 10 is especially useful for track or track car applications where the driver can select the priority for available cooling. System 10 may also be used for high boost engines with high charge air heat loads.

In operation, engine chiller system 10 by default operates in a first or normal mode where chiller shut off valve 82 is closed and refrigerant is directed through open valve 76 and then evaporator 80 to provide cooling to the vehicle cabin. When the driver desires increased engine performance, the driver manually selects a second or track racing mode. For example, the driver may select a track racing mode icon displayed on the user interface 30, provide a voice command to the vehicle, or select a track racing switch/button on the instrument panel, steering wheel, etc.

Once controller 28 receives a signal that the driver has selected the track racing mode, the controller 28 automatically closes or commands closure of evaporator shut off valve 76 and opens chiller shut off valve 82. Accordingly, air conditioning circuit 24 directs refrigerant through bypass loop 26 and chiller 60 to provide secondary cooling to the coolant flowing through low temperature circuit 22. Controller 28 also locks out or disables the vehicle HVAC system controls (not shown), thereby preventing cooling of the vehicle cabin. For example, user interface 30 may display a notification generally indicating that track racing mode is active and that cabin cooling is off to enhance intercooler cooling. Additionally, if the driver attempts to control the air conditioning or defroster while the vehicle is in the track racing mode, the user interface 30 may display an additional pop-up notification that air conditioning is unavailable to enhance intercooler cooling.

Further, in some implementations, once the driver has activated the track racing mode, the controller 28 performs one or more of the following steps: (i) transition the vehicle transmission from a normal mode to a track racing mode; (ii) activate the vehicle paddle shifters; (iii) transition the vehicle traction control from a normal mode to a track racing mode; (iv) transition the vehicle suspension from a normal mode to a track racing mode; and (v) transition the vehicle steering system from a normal mode to a track racing mode.

In one exemplary implementation, transitioning the vehicle transmission may include adapting the transmission to shift schedules optimized for the quickest vehicle acceleration from a stationary vehicle (drag mode) or quickest gear transition response time for a vehicle on a track (track mode). Activating the paddle shifters (not shown), which are typically located on or near the steering wheel or rim, enables the driver to manually shift the vehicle transmission.

Transitioning the vehicle traction control may include a traction control system adopting calibrations configured for optimum wheel slip for maximum acceleration while traveling in a straight line (drag mode) or relaxed pitch and yaw thresholds that enable increased driver input while on a track (track mode). Transitioning the vehicle suspension may include a suspension control adopting calibrations configured for optimum fore-aft weight transfer for maximum acceleration (drag mode) or dynamically compensating side-side stiffness for improved road handling while on a track (track mode). Transitioning the vehicle steering system may include steering controls adapting to provide an increased amount of road input to the driver and require an increased amount of driver input for vehicle control.

A method 200 of controlling a vehicle having a default driving mode and a track racing driving mode includes operating the vehicle in the default driving mode at step 202. At step 204, vehicle controller 28 receives a signal indicating that the driver has activated the track racing mode on the user interface 30. At step 206, controller 28 closes evaporator shut off valve 76 and opens chiller shut off valve 82. At step 208, controller 28 disables the vehicle HVAC system controls to prevent utilization of the air conditioning circuit 24 to provide cooling to the vehicle cabin.

At step 210, user interface 30 displays a notification indicating that track racing mode is active and that cabin cooling is off to enhance intercooler cooling. At step 212, controller 28 transitions the vehicle transmission from a normal mode to a track racing mode. At step 214, controller 28 activates the vehicle paddle shifters.

At step 216, controller 28 transitions the vehicle traction control from a normal mode to a track racing mode. At step 218, controller 28 transitions the vehicle suspension from a normal mode to a track racing mode. At step 220, controller 28 transitions the vehicle steering system from a normal mode to a track racing mode.

At step 222, controller 28 returns the vehicle to the default driving mode after receiving a signal indicating that the driver has deactivated the track racing mode or activated the default driving mode on the user interface 30. Alternatively, at step 224, controller 28 returns the vehicle to the default driving mode when the vehicle is restarted.

Described herein are system and methods for providing additional cooling to a charger intercooler. An engine chiller system incorporates a three-stage cooling system having a first stage low temperature circuit cooled by vehicle ram air, a second stage where the low temperature circuit is cooled by AC circuit refrigerant, and a third stage where the low temperature circuit is used to cool charge air in the intercooler. The system includes a driver selectable control strategy where the amount of intercooler cooling is modified based upon the vehicle's drive mode configuration (e.g., a default driving mode or a track racing mode). The system uses shut off valves in the AC circuit to selectively provide refrigerant to a chiller in thermal communication with the low temperature circuit.

Accordingly, the system can provide additional, on-demand cooling to the intercooler by utilizing the chiller and low temperature circuit. As such, the driver can select various driving modes to prioritize between cabin air conditioner performance and engine power performance, thereby enabling the driver to choose between passenger comfort or engine performance while maintaining current AC component sizing and without negatively affecting vehicle weight or fuel economy.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A chiller system for a vehicle having an engine with a forced induction arrangement, the chiller system comprising:
    an intercooler configured to cool compressed charge air received from a turbocharger or a supercharger;
    a low temperature cooling circuit fluidly coupled to the intercooler, the low temperature cooling circuit circulating a coolant to provide cooling to the intercooler and including a low temperature radiator configured to cool the coolant;
    an air conditioner circuit circulating a refrigerant and having a primary circuit and a bypass circuit, the primary circuit being separate from the low temperature cooling circuit and including a compressor, a condenser, and an evaporator, the bypass circuit including a conduit that bypasses the evaporator, and a chiller shut off valve configured to selectively prevent refrigerant from flowing through the bypass circuit;
    a chiller thermally coupled to the low temperature cooling circuit and the bypass circuit; and
    a controller in signal communication with the chiller shut off valve, the controller programmed to, upon receiving a signal indicating a driver has manually selected the vehicle to operate in a racing mode, open the chiller shut off valve to provide refrigerant to the chiller to further cool the coolant in the low temperature cooling circuit after the coolant is cooled by the low temperature radiator, thereby providing increased cooling to the intercooler and the compressed charge air to increase engine performance,
    wherein when the racing mode is selected, the controller is programmed to disable user air conditioning system controls and air conditioning of a cabin interior of the vehicle.

2. The system of claim 1, wherein racing mode is selected by selecting an icon on a vehicle user interface display.

3. The system of claim 1, wherein the air conditioning circuit further includes an evaporator shut off valve in communication with the controller and disposed upstream of the evaporator, the evaporator shut off valve configured to selectively prevent refrigerant from flowing to the evaporator; and wherein upon the controller receiving the signal indicative of the vehicle being commanded to operate in the racing mode, the controller controls the evaporator shut off valve to close and the chiller bypass valve of the bypass circuit to open thereby providing flow of refrigerant from the primary circuit to the chiller.

4. The system of claim 3, wherein the air conditioning circuit further includes a first expansion valve disposed upstream of the evaporator, and a second expansion valve disposed in the bypass circuit upstream of the chiller.

5. The system of claim 1, wherein the controller is programmed to maintain the user air conditioning system controls and air conditioning of the vehicle cabin interior in the disabled condition while the racing mode is selected.

6. The system of claim 5, wherein when the racing mode is selected, the controller is programmed to display a notification on a vehicle user interface display that the racing mode is active and cabin cooling is disabled.

7. The system of claim 1, wherein the low temperature radiator is disposed in the low temperature cooling circuit downstream of the intercooler and upstream of the chiller.

8. The system of claim 1, wherein the controller is programmed to, in an absence of receiving the signal indicative of the vehicle being commended to operate in the racing mode:

operate the vehicle in a default or normal driving mode where the chiller shut off valve is closed to prevent refrigerant from flowing through the bypass circuit to the chiller;

cool the intercooler with only the coolant in the low temperature cooling circuit that has been cooled by the low temperature radiator; and enable the vehicle air conditioning system controls and air conditioning of the vehicle cabin interior.

9. The system of claim 1, further comprising a high temperature cooling circuit separate from the low temperature cooling circuit and the air conditioning circuit, the high temperature cooling circuit fluidly coupled to the engine and including a high temperature radiator and a thermostat, the high temperature cooling circuit configured to provide cooling to the engine independent of the low temperature radiator circuit and the intercooler.

10. The system of claim 1, wherein the controller is further programmed to maintain the chiller shut off valve in the open position while the vehicle is commanded to operate in the racing mode.

11. The system of claim 10, wherein the controller is further programmed to close the shutoff valve if the driver manually commands the vehicle to operate in a default mode.

12. A method of controlling a vehicle having an engine and a controller in communication with an engine chiller system, the engine chiller system including:

(a) a low temperature cooling circuit thermally coupled to an intercooler that receives compressed charge air from a turbocharger or a supercharger, the low temperature cooling circuit circulating a coolant and including a radiator configured to cool the coolant;

(b) an air conditioner circuit circulating a refrigerant and having a primary circuit and a bypass circuit that bypasses an evaporator of the primary circuit, and includes a chiller shut off valve; and (c) a chiller thermally coupled to the low temperature cooling circuit and the bypass circuit, the method comprising:

receiving a signal indicative of the vehicle being manually selected by a driver of the vehicle to operate in a racing mode;

opening the chiller shut off valve based on receiving the signal such that refrigerant flows to the bypass circuit and the chiller;

cooling the intercooler with the coolant in the low temperature cooling circuit that has been cooled by (i) air flowing through the low temperature radiator and (ii) the refrigerant flowing through the chiller, thereby providing increased cooling to the intercooler and compressed charge air for increased engine performance when the vehicle is in the racing mode; and disabling user air conditioning system controls and air conditioning of a cabin interior of the vehicle when the signal is received.

13. The method of claim 12, wherein the chiller system further comprises an evaporator shutoff valve in the primary circuit upstream of the evaporator, the method further comprising, upon receipt of the signal, commanding the evaporator shutoff valve to close thereby providing flow of refrigerant to the bypass circuit and the chiller for increased cooling of the coolant in the low temperature radiator circuit.

14. The method of claim 13, further comprising, in an absence of receiving the signal:

operating the vehicle in a default or normal driving mode where the chiller shut off valve is closed to prevent refrigerant from flowing through the evaporator bypass circuit to the chiller; and cooling the intercooler with only the coolant in the low temperature cooling circuit that has been cooled by the radiator.

15. The method of claim 12, wherein the signal is received based on user selection of the racing mode via a user interface display in an interior of the vehicle.

16. The method of claim 12, further comprising:

maintaining the user air conditioning system controls and air conditioning of the vehicle cabin interior in the disabled condition while the vehicle operates in the racing mode; and enabling the user air conditioning system controls and air conditioning of the vehicle cabin interior when the racing mode is deactivated.

* * * * *